United States Patent [19]
Burch

[11] 3,859,291
[45] Jan. 7, 1975

[54] 9-(P-ANISIDINO)-7-METHYL-(1H)-PYRAZOLO[3,4-F]QUINOLINE

[75] Inventor: Homer A. Burch, Norwich, N.Y.

[73] Assignee: Morton-Norwich Products, Inc., Norwich, N.Y.

[22] Filed: Oct. 1, 1973

[21] Appl. No.: 402,574

[52] U.S. Cl. ......... 260/286, 260/288 R, 260/310 C, 424/258
[51] Int. Cl. ...................... C07d 33/52, C07d 49/18
[58] Field of Search ............................... 260/286 R

[56] References Cited
OTHER PUBLICATIONS
Chemical Abstracts, 70:37726h, 72:121431m.

Primary Examiner—Donald G. Daus
Assistant Examiner—D. Wheeler
Attorney, Agent, or Firm—Anthony J. Franze

[57] ABSTRACT

The title compound possesses activity against the tapeworm Hymenolepis nana.

1 Claim, No Drawings

9-(P-ANISIDINO)-7-METHYL-(1H)-PYRAZOLO[3,4-F]QUINOLINE

This invention relates to the chemical compound 9-(p-anisidino)-7-methyl-(1H)-pyrazolo[3,4-f] quinoline. It possesses anthelmintic properties. When administered perorally to mice harboring the tapeworm *Hymenolepis nana* at a dose of 300 mg/kg b.i.d. for 3 days, a 90 percent reduction in worm population is secured.

In order that this invention may be readily available to those skilled in the art a brief description of its preparation is supplied.

A. Ethyl 3-(5-Indazolylamino)crotonate

A mixture of 100 g (0.75 mole) of 6-aminoindazole, 1 ml of acetic acid and 97 g (0.75 mole) of ethyl acetoacetate in 1,350 ml of ethanol was heated to boiling. The resulting solution was evaporated in vacuo leaving a solid residue. The residue was slurried with ethanol and the crude product was collected to yield 150 g (87 percent). A 60 g sample was recrystallized from ethanol (Darco) to give light tan needles melting at 139°–140° corr. in a yield of 55 g.

Anal. Calcd. for $C_{13}H_{15}N_3O_2$: C, 63.66; H, 6.16; N, 17.13.

Found: C, 63.49; H, 6.00; N, 17.35.

B. 7-Methyl-(1H)-9-pyrazolo[3,4-f]quinolinol Hydrochloride

To 1,200 ml of boiling Dowtherm was added in portions 75 g (0.3 mole) of A. After all was added the mixture was boiled for 6 min. and then plunged into an ice bath. The mixture was diluted with acetone to yield 45 g (74 percent). This solid was suspended in 1 liter of methyl alcohol and methanolic hydrogen chloride was added until the solution was very acidic. The resulting solution was evaporated in vacuo to leave a solid residue. The residue was recrystallized from ethyl alcohol to give the product as colorless needles melting at 400° in a yield of 40.8 g (57 percent).

Anal. Calcd. for $C_{11}H_9N_3O \cdot HCl$: C, 56.06; H, 4.28; N, 17.83

Found: C, 56.03; H, 4.45; N, 17.77

C. 9-Chloro-7-methyl-(1H)-pyrazolo[3,4-f] quinoline Hydrochloride

To 2,500 ml of phosphorus oxychloride was added slowly 150 g (0.75 mole) of B. (free base). The mixture was refluxed for 1 hr, cooled and the solid collected by filtration and rinsed with benzene. The solid was dissolved in 3,500 ml of water and was filtered. The filtrate was treated with ammonium hydroxide until slightly basic with cooling by addition of ice. The white solid was collected in a yield of 160 g (98 percent). A 50 g sample was recrystallized from methyl alcohol to give colorless needles melting at 218°–220° (corr.) in a yield of 43 g. This was dissolved in 1.75 liter of methyl alcohol and was treated with an ether-hydrogen chloride solution until very acidic. The mixture was cooled and diluted with anhydrous ether. The product was collected as cream colored needles melting over 400° in a yield of 41 g (82 percent) conversion to hydrochloride).

Anal. Calcd. for $C_{11}H_8ClN_3 \cdot HCl$: C, 51.99; H, 3.57; N, 16.54

Found: C, 52.15; H, 3.55; N, 16.83

D. 9-(p-Anisidino)-7-methyl-(1H)-pyrazolo[3,4-f]quinoline Hydrochloride Hemihydrate A mixture of 33 g (0.15 mole) of the free base of C. and 38 g (0.15 mole) of p-anisidine in 1,800 ml of ethanol was refluxed with stirring for 6 hr. After filtering, the filtrate was evaportated in vacuo to dryness. The solid residue was recrystallized from ethanol to give the product as yellow needles melting at 314°–316° (corr.) in a yield of 22 g (43.5 percent).

Anal. Calcd. for $C_{18}H_{16}N_4O \cdot HCl \cdot 1/2 H_2O$: C, 61.80; H, 5.19; N, 16.02

Found: C, 62.00, 62.09; H, 5.39; N, 15.97.

What is claimed is:

1. The compound 9-(p-anisidino)-7-methyl-(1H)-pyrazolo[3,4-f] quinoline hydrochloride hemihydrate.

* * * * *